(No Model.) 4 Sheets—Sheet 1.

G. N. DOWNS.
IRONING MACHINE.

No. 433,646. Patented Aug. 5, 1890.

Witnesses:
Wm. F. Henning
O. N. Willis

Inventor:
George N. Downs
by Dayton & Poole
Attorneys (No Model.)  4 Sheets—Sheet 2.
G. N. DOWNS.
IRONING MACHINE.
No. 433,646.  Patented Aug. 5, 1890.
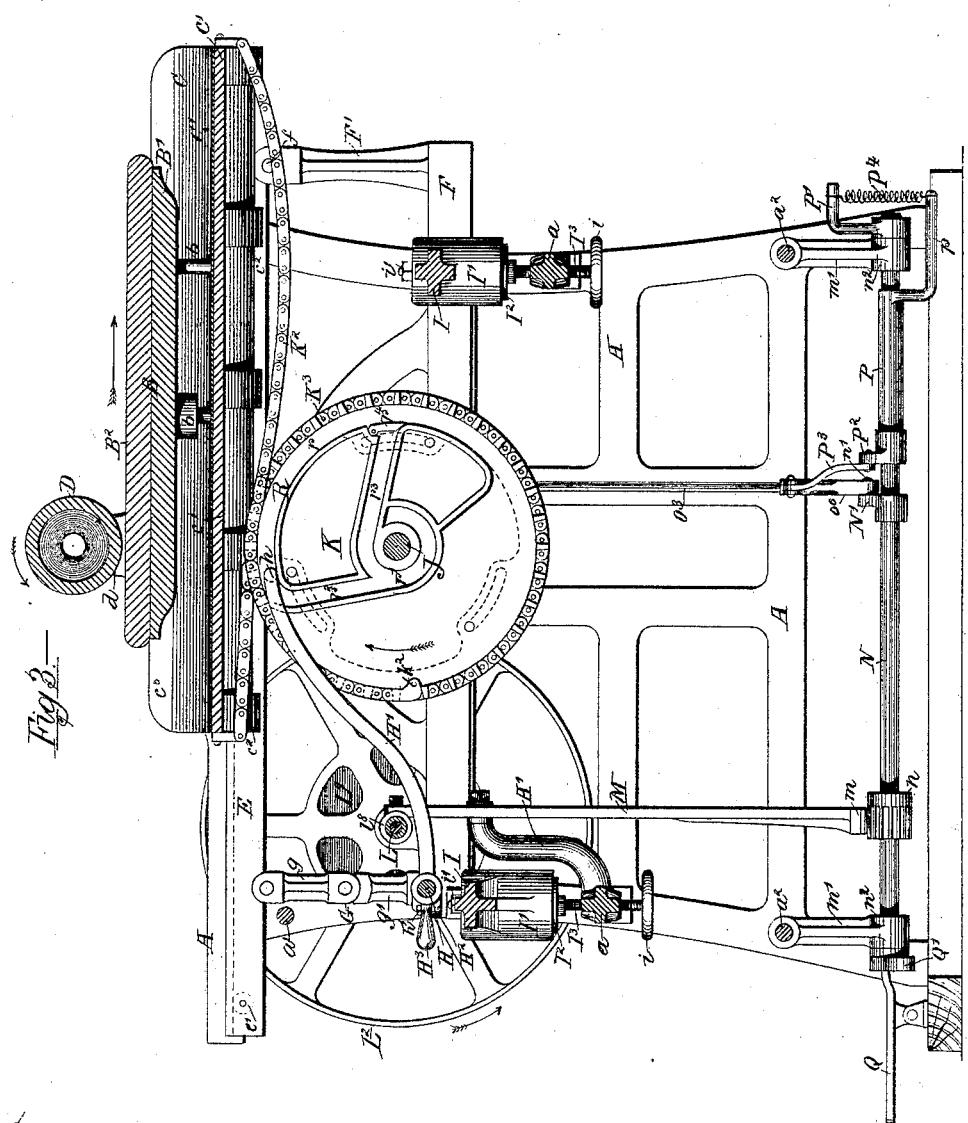
Witnesses.
Wm. L. Henning.
O. N. Willis
Inventor—
George N. Downs
by Dayton & Poole
Attorneys.

(No Model.) 4 Sheets—Sheet 3.
G. N. DOWNS.
IRONING MACHINE.
No. 433,646. Patented Aug. 5, 1890.
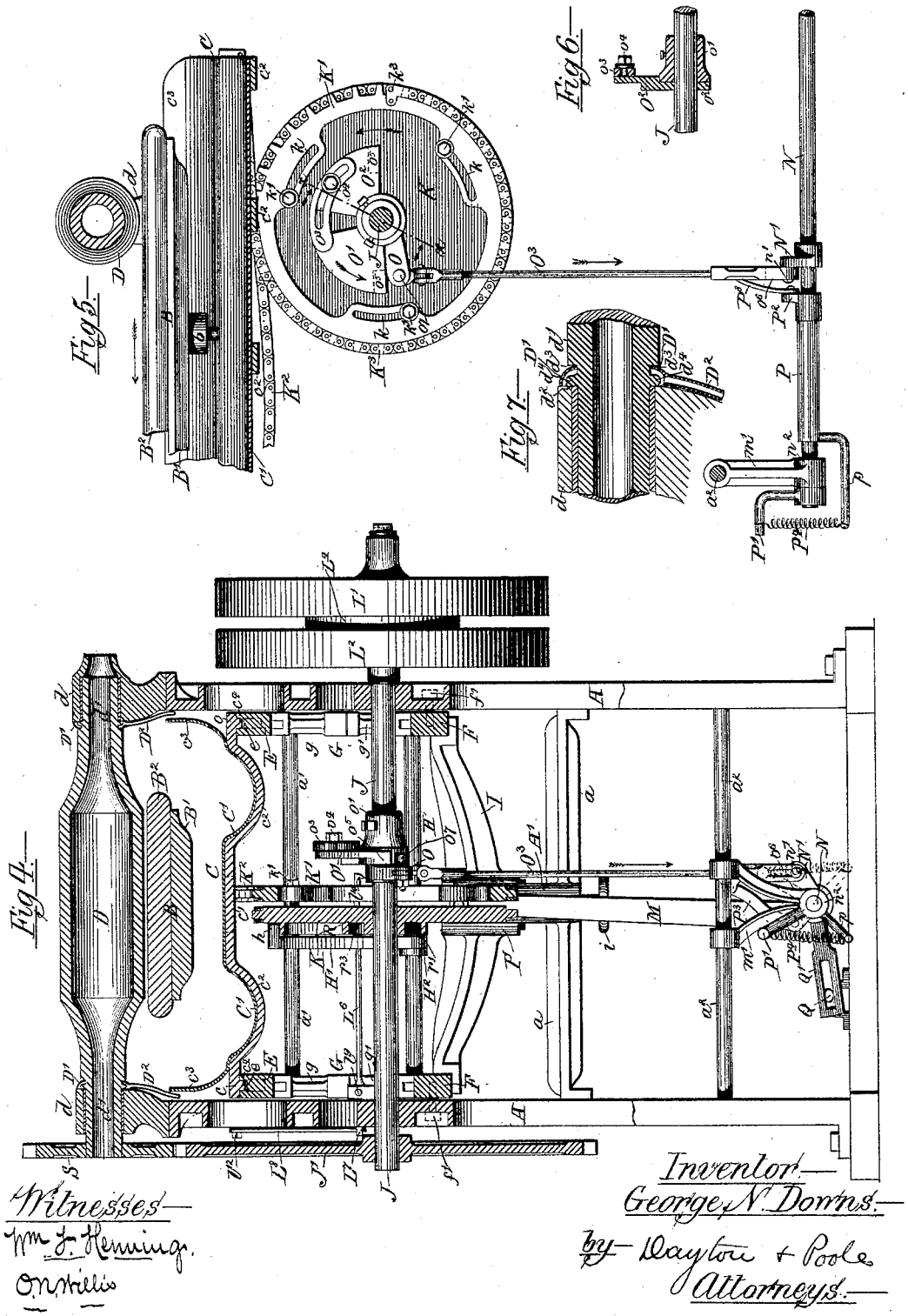
Witnesses
Wm. J. Henning.
On. Willis
Inventor
George N. Downs
by Dayton & Poole
Attorneys (No Model.) 4 Sheets—Sheet 4.
G. N. DOWNS.
IRONING MACHINE.
No. 433,646. Patented Aug. 5, 1890.
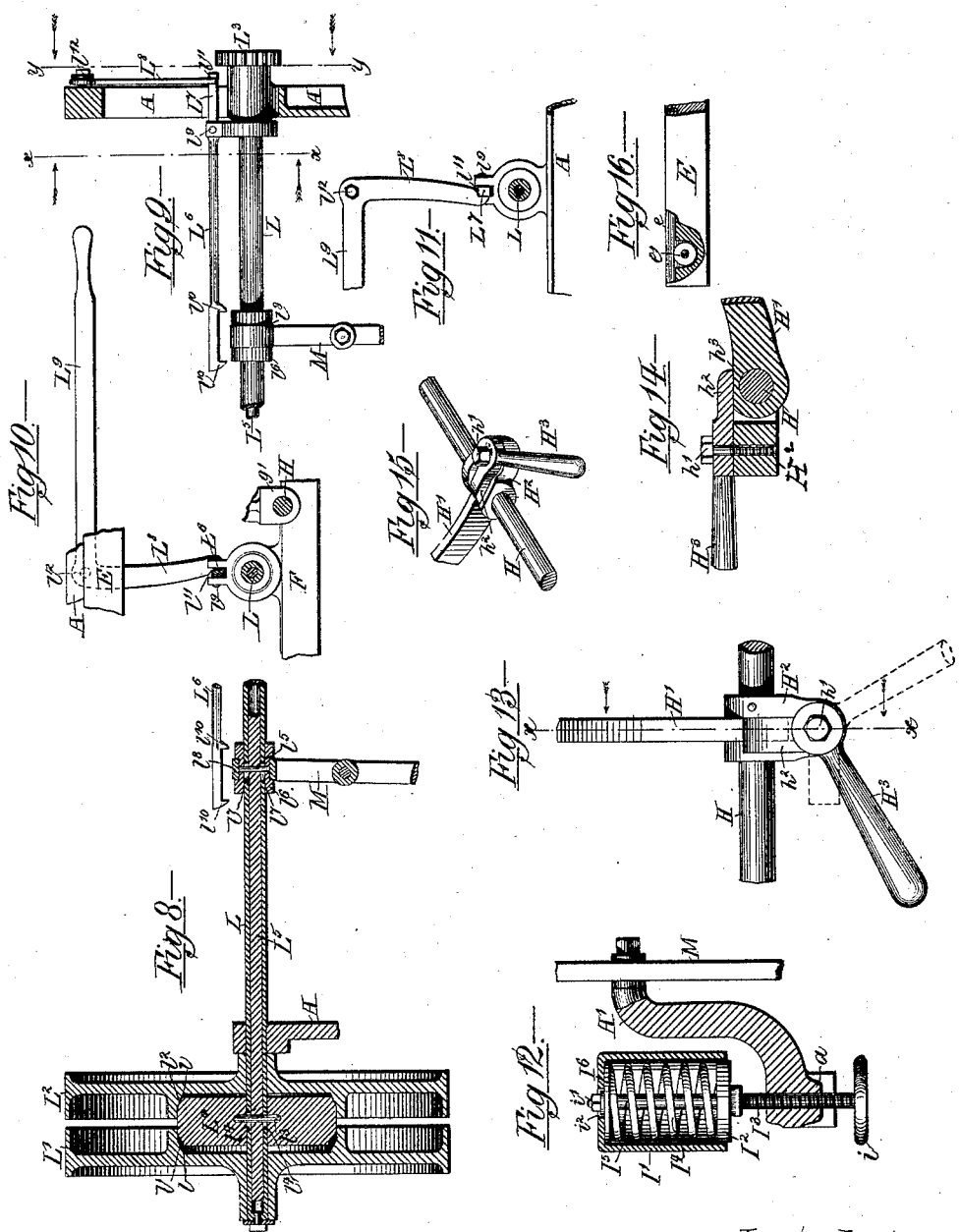
Witnesses
Wm. F. Henning
O. N. Willis
Inventor
George N. Downs
by Dayton & Poole
Attorneys

UNITED STATES PATENT OFFICE.

GEORGE N. DOWNS, OF CHICAGO, ILLINOIS, ASSIGNOR TO THE TROY LAUNDRY MACHINERY COMPANY, OF TROY, NEW YORK.

IRONING-MACHINE.

SPECIFICATION forming part of Letters Patent No. 433,646, dated August 5, 1890.

Application filed August 22, 1887. Serial No. 247,524. (No model.)

*To all whom it may concern:*

Be it known that I, GEORGE N. DOWNS, of Chicago, in the county of Cook and State of Illinois, have invented certain new and useful Improvements in Ironing-Machines; and I do hereby declare that the following is a full, clear, and exact description thereof, reference being had to the accompanying drawings, and to the letters of reference marked thereon, which form a part of this specification.

This invention relates to a novel ironing-machine for laundry use of that class known as a "shirt-bosom ironer," or a machine in which the article to be ironed is placed or held on a flat board or table and is acted upon by a heated roller.

The invention consists in the matters hereinafter described, and pointed out in the appended claims.

Figure 2:
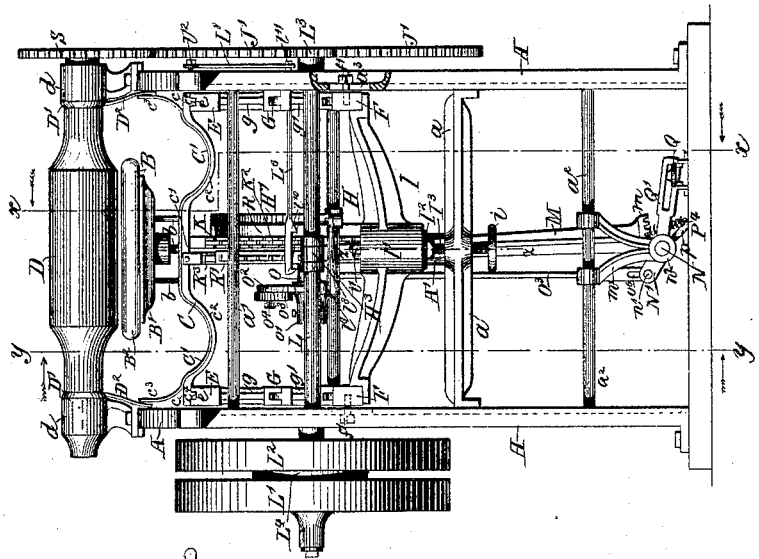
Figure 1:
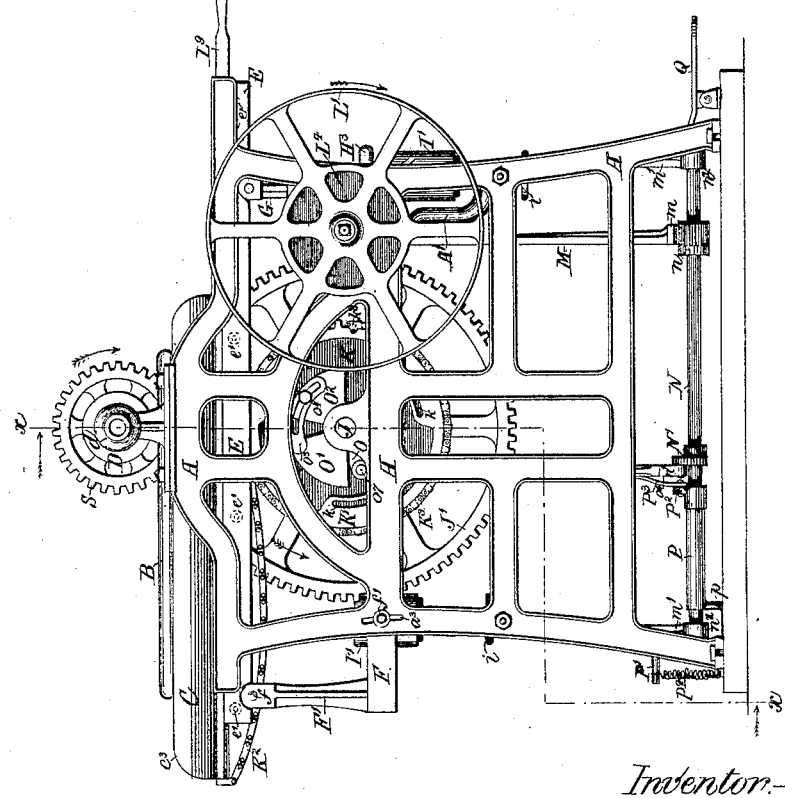

In the accompanying drawings, Figure 1 is a side elevation of a machine embodying my invention. Fig. 2 is a front elevation of the same. Fig. 3 is a central longitudinal vertical section taken upon line $x$ $x$ of Fig. 2. Fig. 4 is a transverse vertical section taken upon line $x$ $x$ of Fig. 1. Fig. 5 is a detail section taken upon line $y$ $y$ of Fig. 2, showing certain parts of the machine in side elevation. Fig. 6 is a detail section taken upon line $x$ $x$ of Fig. 5. Fig. 7 is an enlarged detail section of the bearing of the revolving roller shown in Fig. 4. Fig. 8 is a detail section through the main driving-shaft and loose pulleys thereon, showing the clutch mechanism for connecting said pulleys with the shaft. Fig. 9 is a side elevation of said driving-shaft, showing a device for holding the clutch disengaged from the driving-pulleys. Fig. 10 is a detail section taken upon line $x$ $x$ of Fig. 9. Fig. 11 is a sectional elevation taken upon line $y$ $y$ of Fig. 9. Fig. 12 is a detail section taken upon line $z$ $z$ of Fig. 2. Fig. 13 is a plan view of a shaft by which the reciprocating table of the machine is vertically moved, showing the connection of an oscillating actuating-lever with said shaft. Fig. 14 is a sectional view of the same, taken upon line $x$ $x$ of Fig. 13. Fig. 15 is a perspective view of the parts shown in Figs. 13 and 14. Fig. 16 is a sectional view of one of the guide-bars for the reciprocating carriage, which supports the ironing board or table of the machine, showing an anti-friction roller in said guide-bar.

The main frame of the machine herein illustrated consists of two parallel frame-plates A A, which are rigidly connected by cross-girts $a$ $a'$ $a^2$ $a^2$.

B is the longitudinally-reciprocating ironing board or table of the machine, which is supported upon a sliding carriage C, and is constructed to pass horizontally beneath an ironing or smoothing roller D, which is mounted in stationary bearings $d$ $d$ at the top of the frame-plates A A. Said roller D is hollow, and is heated by gas, steam, or otherwise in a manner heretofore well understood.

The carriage C is supported and arranged to slide upon two horizontally-arranged guide-bars E E, located at opposite sides of the machine within and adjacent to the frame-plates A A. Said guide-bars E E are supported upon two horizontal bars F F, located beneath them, the said bars F F being located adjacent to the inner faces of the frame-plates A A and being yieldingly sustained upon the machine-frame in the manner hereinafter described. At the rear end of the frame the guide-bars E E are sustained from the bars F by means of standards F' F', to the upper ends of which said guide-bars E E are pivotally connected by pivot-pins $f$ $f$. At the forward end of the machine the said guides E are supported from the bars F F by means of two pairs of toggles G G. The upper arms $g$ $g$ of the said toggles are pivoted to the guide-bars E, and the lower arms $g'$ $g'$ thereof are rigidly attached to a horizontal transversely-arranged rock-shaft H, which is mounted at its opposite ends in the said bars F F. The said bars F F are connected with the frame-plates A by means of bolts $f'$ $f'$, which pass through vertical slots $a^3$ $a^3$ in said frame-plates, whereby the said bars F F are allowed to move freely in a vertical direction. The said bars F F are attached at their opposite ends to and supported by metal cross-pieces or yokes I I, which are upheld at their middle portions by spring-supports from the cross-girts $a$ $a$ of the frame. The said spring-connections, in the particular construction thereof herein illustrated, are made as follows:

Each of the cross-pieces or yokes is provided at its middle part with a hollow cylinder I', open at its bottom, and within said cylinder is placed a disk $I^2$, Fig. 12, which is attached to the upper end of a screw-shaft $I^3$, passing through one of the frame-girts $a\ a$. Between the said disk $I^2$ and the upper wall of the cylinder I' is placed a coiled spring $I^4$. Said spring takes the weight of the said yoke I and the parts supported thereon, while the disk $I^2$, being supported upon the screw-shaft $I^3$, may be raised and lowered by turning said screw-shaft to move the several parts supported by the spring upwardly and downwardly as desired. Said screw-shaft $I^3$ is herein shown as provided at its lower end, beneath the girt $a$, with a hand-wheel $i$. In order to provide means for adjusting the force or tension of the spring $I^4$, a rod $I^5$ is attached to the top of the disk $I^2$ in such manner as to extend upwardly through the spring $I^4$, and upon the upper end of said rod $I^5$ is placed a plate or washer $I^6$, which rests in contact with the top wall of the cylinder I' and against which the upper end of the spring bears. The rod $I^5$ passes at its upper end through the said washer $I^6$, and said rod is provided with a nut $i'$, adapted to bear against the said washer, said nut being located in an opening or recess $i^2$ in the top wall of the said cylinder I'. By turning the nut $i'$ upon the shaft the spring may be compressed to a greater or less extent as desired.

The purpose of the yielding or spring connection between the bars F F and the machine-frame afforded by the springs $I^4\ I^4$ is to hold the reciprocating table B yieldingly in contact with the ironing-roller D, and to allow said table to give or move downwardly in the passage beneath the roller of the thicker parts of the articles being ironed. The screw-shafts $I^3\ I^3$ enable the disks $I^2\ I^2$, which support said springs, to be raised and lowered together with the table supported by said springs, thereby enabling the vertical position of the table when in operation, or, in other words, its distance from the roller, to be accurately adjusted, as may be found necessary in placing the machine in proper condition for operation—as, for instance, the table will be adjusted vertically to correspond with the thickness of the cloth coverings commonly placed upon the said table B, and with the thickness of the article being operated upon.

The employment of the rods $I^5\ I^5$ and plates $I^6\ I^6$, or an equivalent device holding the springs under a certain degree of tension, is obviously necessary in a machine made in the particular manner herein illustrated and embracing a vertically-movable board or table, in order that the table may be dropped free of the ironing-roller by a slight movement of the bars supporting the table when the springs sustaining the table are under greater or less tension. The purpose of the adjusting-nuts $i'\ i'$ upon the rods $I^5\ I^5$ is to enable the plates $I^6\ I^6$ to be moved toward or from the plates $I^2\ I^2$, and to thereby compress the springs to a greater or less extent. When the springs are compressed to a slight extent only, the table will yield easily away from the ironing-roller, so that no great pressure can at any time come upon the article being ironed, and when the springs are considerably compressed the table will yield downward only under a strong pressure.

It will of course be understood that the adjustment of the tension of the springs by moving the nuts $i'\ i'$ will change the vertical position of the table so that the use of the adjusting-screws $I^3\ I^3$ to bring the table in proper position with relation to the roller will be necessary after such adjustment of the springs.

The carriage C, as herein shown, consists of a metal frame or casting constructed to rest at its side margins upon the guide-bars E E, and consisting of longitudinal side bars $c\ c$, a central longitudinal bar $c'$ and cross bars or arms $c^2\ c^2$. The ironing-table upon which the articles to be ironed are placed is supported from the carriage C by means of posts $b\ b$. Said table consists of a metal part B', which is permanently secured to the posts and a wooden part or board $B^2$, which forms the top surface of the table. The top of the carriage C is covered by a sheet-metal lining C', which is extended upwardly at the sides of the carriage, as shown at $c^3\ c^3$, Fig. 4, so as to confine the portions of the articles being ironed which overhang from the ironing table and prevent contact of the same with adjacent parts of the machine in the movement of the carriage. To give additional room for bulky articles at either side of the carriage the lining C' and the ribs $c^2$ sustaining the same are bent or curved downwardly, giving a trough shape to the body of the carriage at these points, as clearly shown in Fig. 4. To hold the carriage in position upon the guide-bars E E the latter are herein shown as provided with guide-grooves $e\ e$ in their upper surfaces, and the carriage C as provided with tongues $c^4\ c^4$ entering said grooves.

Within the guide-bars E E are placed a series of anti-friction rollers $e'\ e'\ e'$, Figs. 1, 3, and 16, said rollers being arranged with their upper or bearing surfaces in position to engage the tongues $c^4\ c^4$ of the carriage, so that the weight of the carriage and parts sustained thereby comes upon said rollers instead of upon the top surfaces of the bars. By this construction the carriage may be reciprocated with much less friction and by the application of much less power than would otherwise be necessary.

In order to avoid possibility of the access of oil from the roller-bearings $d\ d$ to the working-surface of the roller D or parts of the frame with which the articles being ironed are liable to come in contact, I provide at the said bearings $d\ d$ devices as follows: The bearing arms or shafts $d'\ d'$ of the rollers D are provided adjacent to the inner surfaces of the bearings $d$ $d$ with shoulders $d^2$ $d^2$, and at points adjacent to said bearings with annular grooves $d^3$ $d^3$, forming annular ribs $d^4$ $d^4$ between said grooves and the shoulders $d^2$ $d^2$. Attached to the inner surface of the bearing is a sheet-metal ring D′, which extends over or around the flange $d^4$, and is brought at its inner edge into the groove $d^3$ and into contact with one of the walls of said groove. At its lower part the ring D′ has attached to it a tube or spout D², which extends downwardly to a point below the side margin of the lining C′ of the carriage. Any oil exuding from the bearing will commonly drip or be cast from the flange $d^4$ and will flow away through the tube D². The ring D′ serves to prevent contact of articles with the flange and at the same time by its close contact with the roller-shaft prevents any oil from passing out of the groove $d^3$ upon the adjacent part of the shaft or roller.

The means herein shown for giving reciprocatory motion to the carriage C and the table B carried thereby are as follows: J is a horizontal shaft having bearings at its opposite ends in the machine-frame at the middle of the latter and beneath the roller D. Upon the said shaft J is rigidly secured a wheel or pulley K, to one side of which is attached a ring K′. About the periphery of the wheel K is placed a link-belt K², connected at one end at $k^2$ with the wheel and at its opposite end with the rear end of the carriage. A similar link belt K³ is secured at one end to the peripheral surface of the ring K′ at $k^3$ and passes partially around said ring and is connected at its opposite end with the front end of the carriage. The reciprocatory movement of the carriage is accomplished by an alternate backward and forward rotation of the said wheel K and ring K′ and the shaft J, upon which said wheel is mounted, the chain K² being employed for producing the backward movement of the carriage C when the wheel K is turned in one direction, while the chain belt K³ comes into action for the purpose of moving the carriage forward when the wheel is turned in the opposite direction. As herein shown, the wheel K and ring K′ are provided with sprocket-teeth engaging the links of the belts K² and K³; but this construction is obviously not essential and is used in the machine shown merely as a means of holding the belts in place upon said wheel and ring.

The wheel K and ring K′ may, as far as the general operation of the machine is concerned, be formed or cast in a single piece, or they may consist of two complete wheels separately secured to the shaft J. As herein shown, however, the ring K′ is supported upon the wheel K and is adjustably connected thereto in such manner that it may be shifted or turned about its axis to tighten or loosen the chains K² K³, as found necessary or desirable. In the particular construction of the parts herein illustrated the ring K′ is provided with concentric slots $k$, through which pass bolts $k'$, securing said ring to the wheel K.

L is a horizontal drive-shaft from which the shaft J is actuated. Said shaft L is mounted upon the machine-frame near the forward end thereof and is provided exteriorly to the frame with two loose pulleys L′ L², over which pass oppositely-driven belts. At its opposite end the shaft L is provided with a gear-pinion L³, which intermeshes with a spur-wheel J′ upon the shaft J. The loose pulleys L′ L² are alternately engaged with the shaft for turning the latter by means of a clutch mechanism consisting of a sliding cone L⁴, mounted upon the shaft between the pulleys and provided with opposite conical bearing-surfaces $l$ $l$, engaging correspondingly-shaped recesses $l'$ $l^2$ in the wheels L′ L². The cone L⁴ is connected with the shaft L, so as to turn with the latter, but has movement longitudinally upon the shaft to enable it to be engaged with either one or the other of the pulleys L′ L², as desired. The shaft L is herein shown as made hollow or tubular, and within the same is located a longitudinally-sliding rod L⁵, to which the said cone L⁴ is connected by means of a pin $l^3$, passing through opposite slots $l^4$ $l^4$ in the said tubular shaft L. The rod L⁵ extends to a point near the middle of the machine and is there connected by means of a pin $l^5$ with a revolving sleeve $l^6$, the said pin $l^5$ being arranged to pass through slots $l^7$ $l^7$ in the tubular shaft, in the manner clearly shown in Fig. 8. The sleeve $l^6$ is provided with a central groove which is engaged by a ring $l^8$, within which the said sleeve is adapted to turn freely. To the said ring $l^8$ is secured the upper end of a vertically-arranged lever M, which is pivoted to a bracket A′ upon the cross-girt $a$ at the front end of the machine, Fig. 3. The lower end of the lever M is provided with a gear-segment $m$, which intermeshes with a pinion $n$, affixed to a shaft N, which is arranged horizontally at the lower part of the machine-frame. Said shaft N is herein shown as sustained by hangers $m'$ $m'$ from the cross-girts $a^2$ $a^2$ of the machine-frame. By partially turning the rock-shaft N the lever M may be oscillated about its pivot, so as to shift the ring $l^8$ and thereby move the cone L⁴ so as to bring it into engagement either with the belt-pulley L′ or L². Devices are herein provided for automatically actuating the said rock-shaft so as to produce a reversal of the motion of the table at opposite limits of its throw, as follows:

O, Figs. 4 and 5, is a crank-arm, which is mounted to rotate freely upon the shaft J, and is connected at its outer end by means of a connecting-rod O³ with a rigid arm N′, affixed to the shaft N. Attached to the shaft J, adjacent to the arm O, are two segments O′ O², the segment O² being connected to the shaft by means of a collar $o^2$, while the other segment O′ is connected to the shaft by means of a hub $o'$, Fig. 6. The segment $O'$ is attached to the shaft by a set-screw passing through the hub $o'$. Said segments $O'$ $O^2$ are provided at their opposite or radial faces with lugs or projections $o^5$ $o^5$, adapted to engage a pin or projection $o^7$ upon the end of the arm O, which is mounted upon the shaft adjacent thereto. Said segments $O'$ $O^2$ are furthermore herein shown as connected with each other by means of a slotted arm $o^3$ upon the plate $O'$, which arm overlaps and is secured to the segment $O^2$ by a bolt $o^4$, whereby the segments may be adjusted with relation to each other, and the distance apart circumferentially of the projections $o^5$ thereby adjusted as desired. The segments $O'$ $O^2$ are so located with reference to the arm O that said segments will strike and move said arm at each limit of the movement of the carriage. It follows that as the shaft J turns in one direction the carriage will move in the same direction until one of the segments $O'$ $O^2$ strikes the crank-arm O, when the shaft N will be turned by the action of the connecting-rod $O^3$ thereon in such manner as to move the lever M, and thereby shift the movable part of the clutch into engagement with the oppositely-rotating belt-pulley. As soon as this has been accomplished the motion of the drive-shaft will be reversed and the table will run backward till the rearmost limit of its movement is reached, when the opposite segment will encounter and move the lever-arm O and again reverse the direction of motion of the parts. By adjusting the segment $O^2$ circumferentially upon the shaft and the segments with relation to each other the points at which the motion of the table is reversed may obviously be accurately adjusted.

As a further and special improvement in devices of the character above set forth I have herein provided means attached to or acting upon the rock-shaft N, whereby said rock-shaft will be turned and held in its changed position for the purpose of quickly reversing the direction of motion of the table, said device being constructed as follows:

P is a sleeve mounted to turn upon the shaft N, said sleeve being provided with a rigid arm $P^2$, located adjacent to the arm $N'$ and extending laterally in a direction away from the arm $N'$. At its opposite end, adjacent to the rear end of the machine, the sleeve P is provided with a second crank-arm $p$, located below the shaft and extending beyond the end of the shaft. At its extreme end, outside of the bearing $n^3$, the shaft is provided with a crank-arm $P'$, and a coiled spring $P^4$ is connected at its opposite ends with the said arms $p$ $P'$. The lower end of the rod $O^3$ is slotted, as shown at $o^6$, Fig. 4, and engages a pin $n'$ upon the arm $N'$ of the crank-shaft N. The said rod $O^3$ is also connected by means of a connecting-rod $P^3$ with the arm $P^2$ upon the sleeve P. The rod $O^3$ being slotted at its lower end may be moved downward a considerable distance before the shaft N is turned thereby, while the rod $P^3$, connecting the rod $O^3$ with the crank-arm $P^2$ of the sleeve P, acts to turn said sleeve as soon as the said rod $O^3$ begins to move under the action of the segment $O'$, Fig. 5, so that in the operation of the parts when the rod $O^3$ is thrust downwardly said sleeve P will be turned in such direction as to carry the arm $p$ thereof laterally under the bearing of the shaft, and the shaft itself will afterward be moved by the engagement of the crank-pin of the arm $N'$ with the end of the slot. In the reverse movement of the table, when the rod $O^3$ is at the lowermost limit of its movement and the segment $O^2$ strikes the arm O and lifts said rod $O^3$, the connecting-bar $P^3$ will first swing the sleeve P, so as to carry the arm $p$ laterally beneath the bearing, and the engagement of the said rod with the crank-pin will afterward move or swing the arm $P'$ to the same side of the shaft as that to which the arm $p$ has been shifted. The two arms $p$ $P'$ commonly stand at the same side of a vertical line passing through the axis of the shaft N, as clearly shown in Fig. 4, and if, when the parts are in this position, the rod $O^3$ is thrust downwardly the sleeve will be rotated to carry the arm $p$ beneath the bearing of the rod and the spring $P^4$ past the center line thereof. When the parts are in this position, the spring $P^4$ is stretched considerably more than when both arms are at the same side of the shaft, so that the spring tends to draw the said arm $P'$ over to the opposite side of the shaft. If the spring were of sufficient strength, it would instantly carry the said arm $P'$ over and move the clutch at this time, but with a spring of such strength as will not produce too great a shock or jar in its action the spring will not be capable of moving the arm $P'$ and actuating the clutch until the arm $P'$ is positively moved by the action of the slotted connecting-rod $O^3$ upon the arm $N'$ of the rock-shaft. When both arms have been shifted in the manner described, a reverse movement of the rod $O^3$ will cause both arms to shift backwardly to the position originally occupied by them.

It is entirely obvious that when the arms $p$ $P'$ are both at one side or the other of the shaft, the spring (which tends to draw the said arms toward each other) will maintain a constant strain on the arms, tending to turn the shaft N and thereby thrust the movable part or cone of the clutch into engagement with the pulley, and this is true when the said arms are at either side of the shaft. By actuating the arm $p$ so as to throw the latter arm to the opposite side of the shaft before the arm $P'$ is moved, a very slight movement of said arm $P'$ will bring the arms into such relative position that the spring will act to quickly draw the said arm $P'$ over and thus release the sliding part of the clutch from one wheel and promptly engage it with the opposite wheel. By the construction in the clutch-actuating devices above described, the movable part of the clutch will be promptly actuated when the table reaches each limit of its movement, while at other times the said movable part of the clutch will be held by spring-pressure tightly in engagement with one or the other of the two loose pulleys.

Q, Figs. 1, 2, 3, and 4, is a pivoted foot-lever which engages a slotted arm Q', attached to the shaft N. Said foot-lever operates to rotate the shaft, and thereby enables the clutch to be actuated and the motion of the table reversed at any desired point.

To enable the machine to be conveniently stopped by the operator without shifting the driving-belts, I have herein shown a detent $L^6$, Figs. 9, 10, and 11, as pivoted to the machine-frame in position to engage the sleeve $l^6$ at the time the said sleeve is in its intermediate position, and the cone $L^4$ of the clutch is free from both pulleys, said detent being arranged to fall by gravity into engagement with the sleeve, and a catch or holding device being provided for sustaining the said detent clear of the sleeve. As illustrated in the drawings, the detent $L^6$ is located above and parallel with the shaft L, and is pivoted at $l^9$ to the machine-frame at a point adjacent to the bearing of said shaft. The said detent is provided at its end adjacent to the sleeve $l^6$ with projections $l^{10}$ $l^{10}$, engaging opposite ends of the sleeve, and at its opposite end with an arm $L^7$, adapted to engage a notch $l^{11}$ in the lower end of the vertical arm of a bent lever $L^8$, which is pivoted at $l^{12}$ to the machine-frame. The said notch $l^{11}$ is provided with an inclined surface adapted to engage the top edge of the arm $L^7$, so that when the detent is released and rests in engagement with the sleeve the contact of said inclined surface of the lever with the arm will depress said arm and raise the detent free from the sleeve. The actuating-arm $L^9$, Fig. 10, of the lever $L^8$ extends horizontally forward from the pivot of the lever, so that said arm serves by its weight to retain the notch $l^{11}$, engaged with the arm $L^7$ and the detent, in its elevated position. By lifting said arm $L^9$ the lever is thrown free of the detent, and the latter is allowed to drop and rest upon the sleeve $l^6$, which it will engage and hold from further movement as soon as the said collar reaches its intermediate position. For driving the roller D the latter is herein shown as provided with a gear-wheel S, intermeshing with the said gear-wheel J'. When the gearing is thus arranged, the surface of the roller D adjacent to the table moves in the same direction as the table, but at a higher rate of speed.

Devices are herein shown for automatically raising and lowering the reciprocating table so as to bring the article being ironed into contact with the roller D while the table is moving in one direction and to allow the said table to drop away or recede from the said roller in the movement of the table in the opposite direction, such devices being made as follows: Pivoted to the rock-shaft H, which, as before described, is rigidly attached to the lower toggle-arms $g'$ of the toggle G, is a lever H', which extends rearwardly and inwardly and terminates at one side of the wheel K, where it is provided with a lateral projection or pin $h$, engaging a cam-slot R, formed upon the side face of the said wheel. The said lever H' is pivoted to the shaft H, but is adapted to be rigidly connected therewith by a suitable securing device, hereinafter described, and when rigid with the shaft the actuation of the outer end of said arm, by the cam-groove R in such manner as to swing the free end of said arm upwardly and downwardly, produces a rocking motion in the shaft H and thereby alternately straightens out and flexes the toggles G, with the result of raising and lowering the guide-bars E E, which are sustained by said toggles.

For the purpose of producing the movement of the rock-shaft H and the toggles at desired times in the manner described, the cam-groove R is made as follows: Said cam-groove has an outer concentric part $r$, in which the pin $h$ of the lever H' travels at the time the toggles are straight and the guide-bars and table are elevated. The cam-groove also has an inner concentric part $r'$, adjacent to the shaft J, in which the pin $h$ travels at the time the toggles are flexed to their greatest extent. The concentric parts $r\ r'$ of the cam-groove are connected by two straight, or nearly straight, parts $r^2\ r^3$, which are arranged obliquely with reference to the radial lines of the wheel, and which are preferably tangent to the inner concentric part $r'$. The part $r^2$ of the slot is for the inward passage of the pin $h$ toward the center of the wheel when the wheel is turned in a direction to carry the carriage and ironing-table backwardly, while the part $r^3$ of said slot is for the purpose of carrying the said pin outwardly toward the periphery of the wheel at the time the wheel is turning in a reverse direction to carry the table forward. At the point where the part $r^3$ of the slot intersects with the part $r$ a hinged switch or gate $r^4$ is provided, adapted to open and allow the pin $h$ to pass freely into the slot $r$, but which will close to prevent the re-entrance of the pin $h$ into the said part $r^3$ of the slot after the reversal of the motion of the wheel, the said slot $r$ being extended considerably past the said part $r^3$, as clearly shown in the drawings. The inner concentric slot $r'$ is extended from the slot $r^3$ past the slot $r^2$ and around the shaft to a point adjacent to the said slot $r^3$, so that the pin $h$ may travel in the said slot $r'$ after it has entered the same from the slot $r^2$ any distance that may be required by the extent of the revolution of the wheel K. As illustrated in the drawings, Fig. 3, the table is traveling backwardly and is nearly at the rearward limit of its movement, and the pin $h$ is in the exterior part $r$ of the cam-groove and has nearly reached the part $r^2$ of said groove, which it enters shortly before the table has reached the extreme rearward limit of its movement, the parts being so arranged that the said pin will reach the inner concentric part $r'$ of the groove before the reversal of the motion of the wheel takes place to start the table forward. The inward movement of the said pin $h$ along the part $r^2$ of the cam-groove flexes the toggles G G, and thereby allows the table B to drop away from the roller D at the time the said table reaches the rearward limit of its movement. When the motion of the wheel K is reversed for carrying the table forward, the pin $h$ travels in the part $r'$ of the cam-groove during a considerable portion of the forward movement of the table, but enters the part $r^3$ of said groove, and is thereby carried upwardly, so as to straighten the toggles and lift the table by the time the latter reaches the forward limit of its movement. The rotation of the wheel in carrying the table forward is sufficient to bring the said pin $h$ out of the groove $r^3$ into the outer concentric part $r$ thereof, and in the reverse motion of the wheel K for again starting the table backward the said pin $h$ travels over the gate $r^4$ and along the part $r$ of the groove, thereby retaining the end of the lever H' in its elevated position and the table B in contact with the roller throughout the entire rearward movement of the table.

The purpose of the vertical movement of the table in the manner described is to enable the article to be ironed by the action of the roller in one direction only. This is desirable, for instance, in ironing shirt-bosoms, where the neckband is held at one end of the board and the bosom is stretched or drawn smoothly away from the said band, so as to take out all wrinkles at the upper part of the bosom, this operation being especially desirable the first few times the roller is passed over the bosom when the latter is in a moist condition. The machine shown is so constructed, however, that when the article—such as a shirt-bosom—has been rendered somewhat dry and smooth by ironing in one direction in the manner stated the automatic devices for raising and lowering the table may be thrown out of action and the table allowed to run horizontally, so as to iron in both directions for the purpose of finishing or polishing the article. To enable the actuating devices by which the table is moved vertically to be thrown out of gear when desired for the purpose stated, the lever H', which, as before mentioned, is pivotally connected with the rock-shaft H, is adapted for rigid attachment thereto by means as follows:

$H^2$, Figs. 3, 13, 14, and 15, is a metal block or arm apertured to allow the passage of the rock-shaft H and rigidly secured thereon, said block or arm $H^2$ being provided with a central recess in which the end of the arm H', which is engaged with the said rock-shaft, is placed.

$H^3$ is a hand-lever pivoted by means of a vertical pivot-pin $h'$ to the block $H^2$. Said hand-lever is provided adjacent to its pivotal point with an arm or spur $h^2$, made flat upon its end or inner side, and adapted to engage a flat surface $h^3$ upon the lever H' in such manner as to hold the said lever from rotation upon the shaft. By swinging the hand-lever $H^3$ about its pivot until the arm $h^2$ thereof is free from the lever H', however, said lever will be released and left free to turn upon the shaft. The position of the hand-lever $H^3$ when the lever H' is disengaged from the shaft is illustrated in dotted lines in Fig. 13. The hand-lever $H^3$ and adjacent parts above described constitute a clutch or locking device, by which the devices for moving vertically the table B may be thrown in and out of action as desired. When the lever H' is free to turn upon the rock-shaft, however, the table B may either be held constantly upward against the roll or it may be dropped and allowed to run free from the roll by swinging the hand-lever $H^3$ vertically and thereby turning the rock-shaft so as either to straighten out or flex the toggles, said toggles being so arranged that when the table is elevated they will be slightly swung past a vertical line, and will thus remain in position to support the table without the use of any holding devices to prevent them from flexing.

The employment in connection with a downwardly-yielding table of the devices for giving vertically-reciprocating motion to the table mounted upon the bars F F, which yield downwardly with the table and which embrace a lever H', engaging a cam mounted upon a stationary part of the frame, enables the table and its supports to yield without appreciably affecting the operation of said cam and actuating-lever.

The table and carriage shown together constitute a movable support for the articles to be ironed, which support may obviously be made of other form than the particular one herein illustrated without departure from my invention.

I claim as my invention—

1. The combination, with an ironing-roller, of a horizontal reciprocating support for the articles to be ironed, automatic actuating means for giving intermittent vertical vibrating movement to said support, a locking device by which said actuating means may be thrown into or out of operation when desired, a hand-lever and intermediate connections between the same and the support, whereby the latter may be moved vertically by hand and held in either an elevated or depressed position when the automatic mechanism for operating the same is not in action.

2. The combination, with an ironing-roller, of a horizontally-reciprocating vertically-movable support for the articles to be ironed, and a rock-shaft, intermediate connections between the same and the support, actuating devices giving intermittent oscillating motion to said rock-shaft, a locking device for connecting and disconnecting said actuating devices and rock-shaft, and a hand-lever attached to said rock-shaft for oscillating the same by hand, whereby the support may be moved vertically by hand when the actuating devices are disconnected from said shaft.

3. The combination, with an ironing-roller, of a reciprocating vertically-movable support for the articles to be ironed, a rock-shaft having rigid arms, links connecting the same with the support, means giving intermittent oscillating motion to said rock-shaft, a locking device operatively connecting said actuating means with the rock-shaft, and a hand-lever mounted upon the rock-shaft and applied to actuate the locking device, said hand-lever being adapted also for turning the shaft.

4. The combination, with an ironing-roller, a support for the articles to be ironed, and means giving a horizontally-reciprocating motion to said support, comprising an oscillating shaft, a pulley upon the shaft, and devices connecting the pulley with the support, of vertically-movable guide-bars sustaining said support, and means for giving a vertically-vibratory motion to said guide-bars, comprising toggles supporting said guide-bars, an oscillating arm for moving the toggles, a cam upon said shaft for moving said arm, and means for throwing said arm into and out of operation.

5. The combination, with an ironing-roller, a support for the articles to be ironed, and means giving a horizontal reciprocatory motion to said support, of vertically-movable guide-bars sustaining said support, a rock-shaft, operative connections between the rock-shaft and the guide-bars for moving the support vertically when the rock-shaft is turned, an actuating-arm pivoted to said rock-shaft, a locking device for holding the arm rigid with the shaft, and a cam engaged with said actuating-arm for giving oscillatory movement to the latter.

6. The combination, with an ironing-roller, a support for the articles to be ironed, and means giving a horizontal reciprocatory motion to said support, of vertically-movable guide-bars sustaining the carriage, a rock-shaft, operative connections between said rock-shaft and the guide-bars for moving the support vertically when the rock-shaft is turned, an actuating-arm pivoted to said rock-shaft, means giving oscillatory motion to said arm, a locking device for holding the actuating-arm rigid with the rock-shaft, said locking device being provided with a hand-lever for operating the same, which hand-lever is connected with the shaft by a pivot arranged at right angles to the latter.

7. The combination, with the rock-shaft H and actuating-arm H', pivoted thereon, and provided with a flat face adjacent to the shaft, of the arm or block $H^2$, rigidly attached to the shaft, and a hand-lever $H^3$, pivoted to the block $H^2$, and provided with an arm adapted to engage the flat face of the said actuating-arm.

8. The combination, with an ironing-roller, a support for the articles to be ironed, and means giving a horizontal reciprocatory motion to said support, comprising a shaft and means turning said shaft alternately in opposite directions, of guide-bars sustaining the support, a rock-shaft connected with the said guide-bars by devices giving a vertical movement to the support when the rock-shaft is turned, an actuating-arm in connection with said rock-shaft, and an oscillating grooved cam for actuating said rock-shaft, provided with an outer concentric part or bearing-surface $r$, an inner concentric part $r'$, oblique parts $r^2$ $r^3$, and a gate $r^4$.

9. The combination, with an ironing-roller and a support for the articles to be ironed, of means giving horizontal reciprocating motion to the support comprising a shaft, means turning said shaft alternately in opposite directions, and a wheel K upon said shaft operatively connected with said support, said wheel K being provided at one of its side faces with a cam-groove R, consisting of outer and inner concentric parts $r$ $r'$, inclined parts $r^2$ $r^3$, a switch $r^4$, guide-bars sustaining said support, a rock-shaft connected with said guide-bars by devices giving vertical movement to the said guide-bars when the rock-shaft is turned, and an actuating-arm attached to said rock-shaft and engaging said groove R of the said wheel K.

10. The combination, with an ironing-roller and a horizontally-movable support for the articles to be ironed, of means for actuating said support, comprising a shaft J, provided with a wheel K, a second wheel or ring K', adjustable circumferentially with relation to the wheel K, and chains connected with the said support and attached to and resting in contact with the peripheries of said wheels K and K'.

11. The combination, with the machine-frame, an ironing-roller, and a horizontally-reciprocating support for the articles to be ironed, of means for sustaining said support, embracing plates vertically movable upon the machine-frame, means sustaining the plates upon the frame, springs resting upon said plates, and adjustable means limiting the expansion of said springs, whereby the support may be accurately adjusted in vertical position and may at the same time be made to act with a desired pressure.

12. The combination, with the machine-frame, ironing-roller, and reciprocating support for the articles to be ironed, of guide-bars E E, sustaining said support, springs, as $I^4$ $I^4$, sustaining said guides from the machine-frame, intermediate supports connecting the springs with the guides, vertically-movable plates $I^6$ $I^6$, against which the upper ends of said springs bear, and adjustable stops, as nuts $i'$ $i'$, for limiting the expansion of the springs.

13. The combination, with an ironing-roller and a horizontally-reciprocating support for the articles to be ironed, of vertically-yielding bars F F, means for giving vertical motion to the support mounted upon the bars F F and embracing an actuating-arm H', a shaft mounted upon the machine-frame, wheels upon the shaft, chains connecting said wheels with the ends of the support, a cam mounted upon the shaft and engaging said arm, and means for throwing the latter into and out of operative relation with the other parts.

14. The combination, with the machine-frame and bars F F, of yokes I I, sustaining said bars, screw-shafts $I^3$ $I^3$, engaging the frame and provided with plates or disks $I^2 I^2$, springs $I^4 I^4$, interposed between said plates or disks and said yokes, rods $I^5 I^5$, attached to said disks, plates $I^6 I^6$, sliding upon the rods $I^5 I^5$, and nuts $i'$ $i'$ upon the rods bearing upon the said plates $I^6 I^6$.

In testimony that I claim the foregoing as my invention I affix my signature in presence of two witnesses.

GEORGE N. DOWNS.

Witnesses:
C. CLARENCE POOLE,
O. N. WILLIS.